US 6,707,517 B2

(12) United States Patent
Stephenson

(10) Patent No.: US 6,707,517 B2
(45) Date of Patent: *Mar. 16, 2004

(54) TRANSPARENT FIELD SPREADING LAYER FOR DISPERSED LIQUID CRYSTAL COATINGS

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/036,148

(22) Filed: Dec. 26, 2001

(65) Prior Publication Data

US 2003/0117547 A1 Jun. 26, 2003

(51) Int. Cl.[7] .............................................. G02F 1/1333
(52) U.S. Cl. .............................. 349/86; 349/89; 349/92
(58) Field of Search .............................. 349/86, 89, 92, 349/115, 185

(56) References Cited

U.S. PATENT DOCUMENTS

| 3,816,786 | A | | 6/1974 | Churchill et al. | |
|---|---|---|---|---|---|
| 4,435,047 | A | | 3/1984 | Fergason | |
| 5,289,301 | A | | 2/1994 | Brewer | |
| 5,437,811 | A | | 8/1995 | Doane et al. | |
| 6,043,856 | A | * | 3/2000 | Stephenson et al. | 349/86 |
| 6,211,931 | B1 | * | 4/2001 | Fukao et al. | 349/86 |
| 6,268,092 | B1 | * | 7/2001 | Akashi et al. | 430/7 |
| 6,359,673 | B1 | * | 3/2002 | Stephenson | 349/185 |
| 2002/0093605 | A1 | * | 7/2002 | Stephenson | 349/86 |
| 2002/0180924 | A1 | * | 12/2002 | Sobrinho | 349/158 |
| 2003/0038912 | A1 | * | 2/2003 | Broer et al. | 349/122 |
| 2003/0117548 | A1 | * | 6/2003 | Stephenson | 349/86 |

FOREIGN PATENT DOCUMENTS

WO   WO 97 04398   2/1997

* cited by examiner

Primary Examiner—Tarifur R. Chowdhury
Assistant Examiner—Mike Qi
(74) Attorney, Agent, or Firm—Raymond L. Owens

(57) ABSTRACT

A display sheet having polymer dispersed liquid crystals, includes a substrate and a state changing layer disposed over the substrate and defining first and second surfaces, such state changing layer having the polymer dispersed liquid crystals having first and second optical states, which can change state. The display sheet further includes first and second conductors disposed respectively over first and second surfaces of the state changing layer so that when a field is applied between the first and second conductors, the liquid crystals change state; and a nonconductive, field spreading layer having a transparent electrically conductive polymer dispersed sub-micron particles disposed between the state changing layer and the first conductor to provide a change of state in the state changing layer in the areas between both conductors in response to a field applied between the first and second conductors which changes the state of the liquid crystals.

17 Claims, 7 Drawing Sheets

US 6,707,517 B2

TRANSPARENT FIELD SPREADING LAYER FOR DISPERSED LIQUID CRYSTAL COATINGS

CROSS REFERENCE TO RELATED APPLICATIONS

Reference is made to commonly assigned U.S. patent application Ser. No. 09/146,656, filed Sep. 3, 1998 by Stanley W. Stephenson et al.; U.S. patent application Ser. No. 09/336,93, filed Sep. 14, 2001 by Stanley W. Stephenson; U.S. patent application Ser. No. 09/764,015, filed Jan. 17, 2001 by Stanley W. Stephenson; and U.S. patent application Ser. No. 10/036,149, filed concurrently herewith entitled "Field Spreading Layer for Dispersed Liquid Crystal Coatings" by Stanley W. Stephenson; the disclosures of which are incorporated herein by reference.

FIELD OF THE INVENTION

The present invention relates to a display sheet that can change states to provide a viewable image.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically written areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet can be individually addressed. The patent recites prior art in forming thin, electronically written pages, including flexible sheets, image modulating material formed from a bi-stable liquid crystal system, and thin metallic conductor lines on each page.

Fabrication of flexible, electronically written display sheets is disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operates on the liquid crystal material to expose display areas. The display uses nematic liquid crystal material that ceases to present an image when de-energized.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal conic state. Said structure has the capacity of maintaining one of the given states in the absence of an electric field.

U.S. Pat. No. 3,816,786 discloses a layer of encapsulated cholesteric liquid crystal responsive to an electric field. The conductors in the patent can be transparent or non-transparent and formed of various metals or graphite. It is disclosed that one conductor must be light absorbing and it is suggested that the light absorbing conductor be prepared from paints containing conductive material such as carbon.

U.S. Pat. No. 5,289,301 discusses forming a conductive layer over a liquid crystal coating to form a second conductor. The description of the preferred embodiment discloses Indium-Tin-Oxide (ITO) over a liquid crystal dispersion to create a transparent conductor.

Current state of the art discloses the need for a second conductor over a polymer dispersed liquid crystal material. In particular, cholesteric materials require one of the two conductors to be light absorbing and conductive. Materials have been proposed for the application including carbon or metal oxides to create a black and conductive surface for polymer dispersed cholesteric liquid crystal materials. Because there is inactive material between the conductors, it would be desirable to maximize the use of the inactive material.

SUMMARY OF THE INVENTION

It is an object of the invention to provide a method of increasing the active area driven by two crossing electrodes.

This object is achieved in a display sheet having polymer dispersed liquid crystals, comprising:

a) a substrate;

b) a state changing layer disposed over the substrate and defining first and second surfaces, such state changing layer having the polymer dispersed liquid crystals having first and second optical states, which can change state;

c) a first conductor disposed over the first surface of the state changing layer;

d) a second conductor on the second surface of the state changing layer so that when a field is applied between the first and second conductors, the liquid crystals change state; and e) a nonconductive, field spreading layer having a transparent electrically conductive polymer dispersed sub-micron particles disposed between the state changing layer and the first conductor to provide a change of state in the state changing layer outside of areas between both conductors in response to a field applied between the first and second conductors which changes the state of the liquid crystals.

The present invention uses a transparent field spreading layer to improve the active areas driven by crossed electrodes. The structure of the transparent field spreading layer minimizes additional voltage required for a thicker active materials coating.

DETAILED DESCRIPTION OF THE PREFERRED EMBODIMENT

Figure 1A:
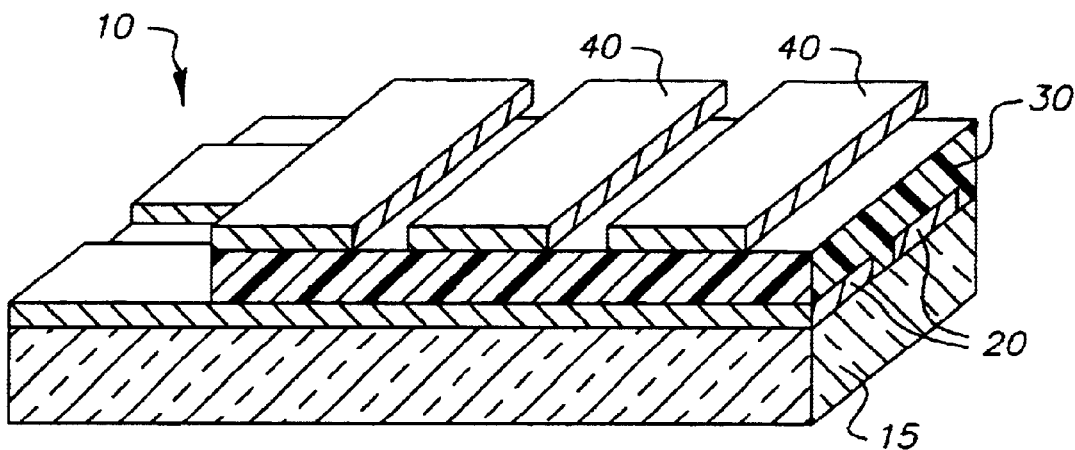
FIG. 1A is a sectional view of a sheet having a polymer dispersed cholesteric liquid crystal in accordance with prior art.

FIG. 1A is a sectional view of a display sheet 10 having a polymer dispersed cholesteric liquid crystal made in accordance prior art. Sheet 10 includes a flexible substrate 15, which is a thin transparent polymeric material, such as Kodak Estar film base formed of polyester plastic that has a thickness of between 20 and 200 microns. In an exemplary embodiment, substrate 15 can be a 125 micron thick sheet of polyester film base. Other polymers, such as transparent polycarbonate, can also be used. Alternatively, substrate 15 can be a glass sheet.

First conductors 20 are formed over substrate 15. First conductors 20 can be Tin-Oxide or Indium-Tin-Oxide (ITO), with ITO being the preferred material. Typically the ITO comprising first conductors 20 is sputtered as a layer over substrate 15 to form a layer having a sheet resistance of less than 250 ohms per square. First conductors 20 can be patterned by conventional lithographic or laser etching means.

A state-changing layer is formed by coating a polymer dispersed cholesteric layer 30 onto first patterned conductors 20. The polymer dispersed cholesteric layer 30 defines first and second surfaces. Cholesteric materials can be created that have peak reflectance from the infrared through the visible spectrum by varying the concentration of chiral dopant in a nematic liquid crystal. Application of electrical fields of various intensities and duration can drive a chiral nematic material (cholesteric) into a reflective state, a transmissive state or an intermediate state. These materials have the advantage of maintaining a given state indefinitely after the field is removed. Such materials can be cholesteric liquid crystal materials such as Merck BL112, BL118 or BL126, available from EM Industries of Hawthorne, N.Y.

Figure 2:
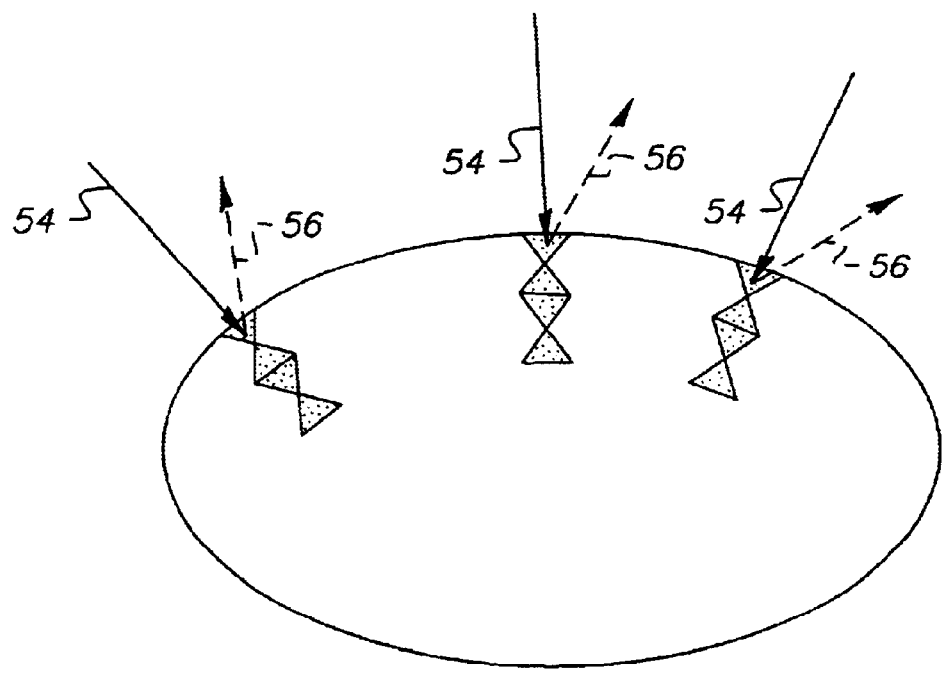
FIG. 2 is a sectional view of a domain of cholesteric liquid crystal in a polymer matrix.

FIG. 2 shows a portion of a polymer dispersed cholesteric layer 30, which can be cholesteric material dispersed in deionized photographic gelatin. A liquid crystal material can be dispersed at 8% concentration in a 5% deionized gelatin aqueous solution. It has been found that 10 micron diameter domains of the cholesteric liquid crystal in aqueous suspension optimize the electrooptical properties of the cholesteric material. The first surface of polymer dispersed cholesteric layer 30 is coated over first conductors 20 to provide a 10 micron thick polymer dispersed cholesteric coating. Other organic binders such as polyvinyl alcohol (PVA) or polyethylene oxide (PEO) can be used as the polymeric agent. Such compounds are can be coated on equipment associated with photographic films.

Figure 3:
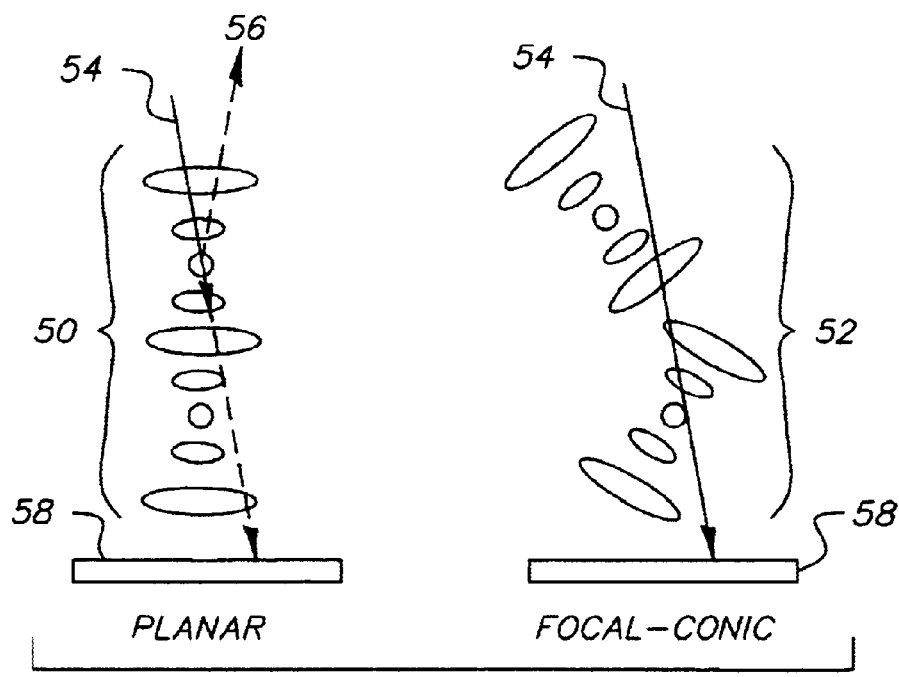
FIG. 3 is a view of the optical characteristics of cholesteric liquid crystal in each of two stable states.

FIG. 3 shows two stable states of cholesteric liquid crystals. On the left, a high voltage field has been applied and quickly switched to zero potential, which converts cholesteric liquid crystal to planar liquid crystal 50. Portions of incident light 54 striking planar liquid crystal 50 becomes reflected light 56 to create a bright image. On the right, application of a lower voltage field converts cholesteric liquid crystal to a transparent focal conic liquid crystal 52. Incident light 54 striking focal conic liquid crystal 52 is transmitted. A light absorber 58 will absorb incident light 54 to create a dark image in areas having focal conic liquid crystal 52. As a result, a viewer perceives an image having bright and dark areas depending on if the cholesteric material is planar liquid crystal 50 or focal conic liquid crystal 52, respectively. A sheet 10 having polymer dispersed cholesteric layer 30 must have a transparent conductor and one light absorbing conductor. In the first exemplary embodiment, first conductor 20 is transparent ITO.

In FIG. 1A, a second conductors 40 opposed to the first conductors 20 need to be light absorbing to act as light absorber 58. Second conductors 40 should have sufficient conductivity to carry an electric field across polymer dispersed cholesteric layer 30. Second conductors 40 have been characterized by prior art by being a conductive material such as aluminum, tin, silver, platinum, carbon, tungsten, molybdenum, tin or indium or combinations thereof. It is also well known that oxides of many of these metals are light absorbing to provide light absorber 58. The prior art teaches that second conductors 40 can be printed conductors. First conductors 20 and second conductors 40 can be a pattern of orthogonal conductors forming an addressable matrix of pixels. In a preferred embodiment, the first conductor is transparent and includes indium-tin-oxide and the second conductor is substantially opaque. Alternatively, the first conductor can be opaque and the second conductor transparent.

Figure 1B:
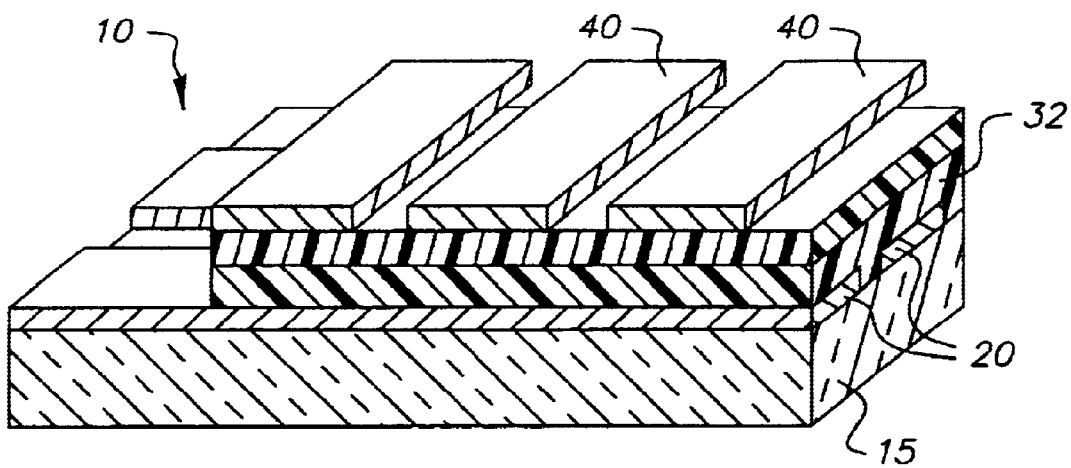
FIG. 1B is a sectional view of a sheet having a polymer dispersed cholesteric liquid crystal in accordance with the present invention.

FIG. 1B is a sectional view of a display sheet having polymer dispersed cholesteric layer 30 in accordance with the present invention. A transparent field spreading layer 34 is disposed between first conductors 20 and polymer dispersed cholesteric layer 30. The transparent organic conductor can be Baytron B polythiophene suspension from Agfa-Gevaert N.V. of Morsel, Belgium. For an experimental coating, field spreading layer 32 can be 1.0 weight percent deionized gelatin and 1.0 weight percent sub-micron (nanoparticle) polythiophene coated over first conductors 20 at a 25 micron wet thickness. The dried transparent field spreading layer 34 will be approximately 0.4 microns thick. The resulting transparent field spreading layer 34 is functionally transparent and has a sheet resistance of over one mega-ohm. The resulting coating is functionally nonconductive compared to adjacent first conductors 20. Transparent field spreading layer 34 can activate cholesteric liquid crystal material past the edge of a field carrying electrode. In making sheet 10, the sheet can be in the form of a web that is sequentially moved through one or more stations which sequentially or simultaneously deposits the state changing layer 30 or transparent field spreading layer 32.

Second conductors 40 overlay polymer dispersed cholesteric layer 30. Second conductor 40 has sufficient conductivity to support a field across polymer dispersed cholesteric layer 30. Second conductor 40 can be formed in a vacuum environment using materials such as aluminum, tin, silver, platinum, carbon, tungsten, molybdenum, tin or indium or combinations thereof. Oxides of said metals can be used provide a dark second conductor 40. The metal material can be excited by energy from resistance heating, cathode arc, electron beam, sputtering or magnetron excitation. Tin-Oxide or Indium-Tin Oxide coatings permit second conductor 40 to be transparent.

Alternatively, second conductor 40 can be printed conductive ink such as Electrodag 423SS screen printable electrical conductive material from Acheson Corporation. Such printed materials are finely divided graphite particles in a thermoplastic resin. Printed conductors require at least 125 microns between adjacent conductive conductors. Material between conductors is typically inactive. Printed conductors are applicable to coarse displays having large intra-conductor spacing, such as matrix displays with a pitch of over 1 millimeter, and vacuum evaporated metals are most applicable to sub-millimeter pitch displays. Field spreading layer 32 is useful in applications using either etched evaporated metal or printed second conductors 40.

The voltage required to change the optical state the polymer dispersed cholesteric layer 30 is proportional to the distance between the opposing conductors. Polymer dispersed cholesteric layer 30 must be at least 4 microns thick to have high reflectivity. The disclosed transparent field spreading layer 32 transmits an applied voltage sufficiently so that the thickness of transparent field spreading layer 32 does not require substantial increases in drive voltages.

Figure 4A:
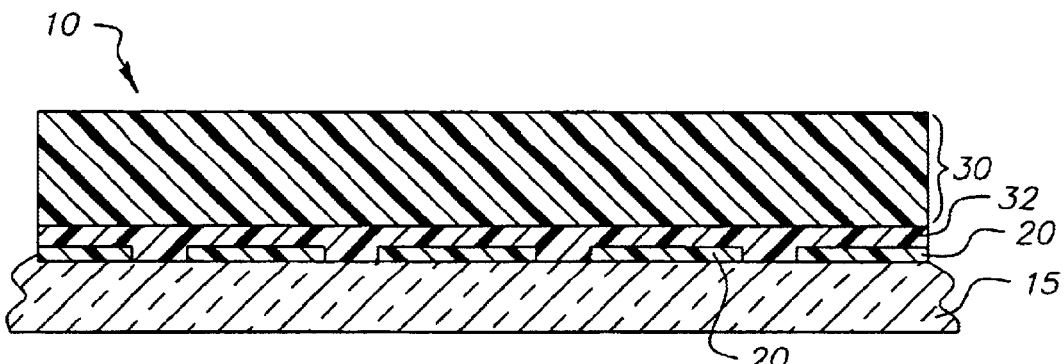
FIG. 4A is a sectional view of a sheet coated with a polymer dispersed cholesteric liquid crystal and a transparent field spreading layer in accordance with the present invention.
Figure 4B:
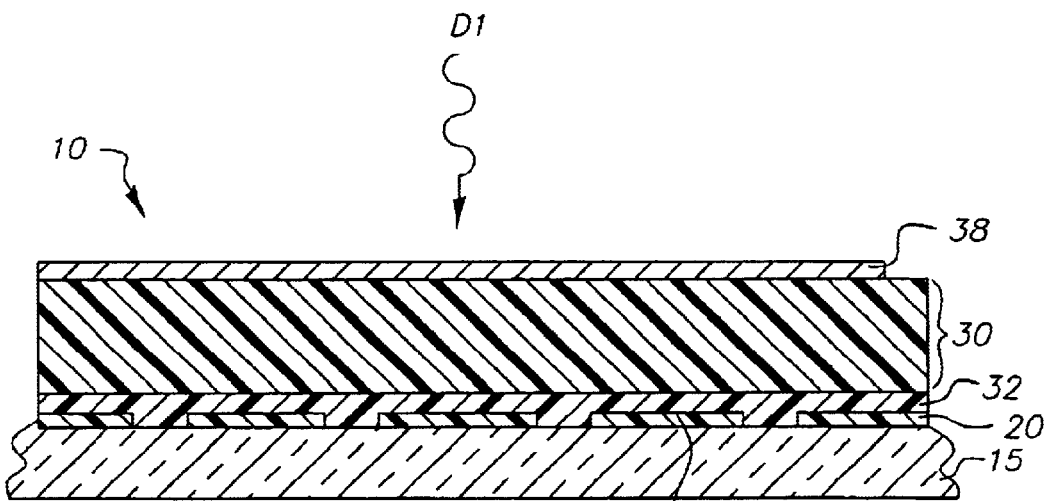
FIG. 4B is as sectional view of the sheet of FIG. 4A receiving an evaporative coating.
Figure 4C:
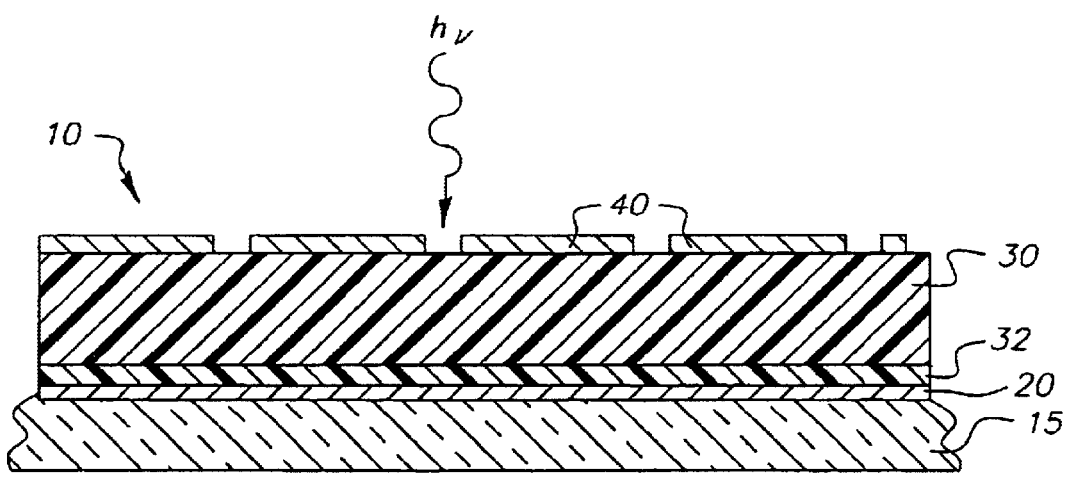
FIG. 4C is a sectional view of the sheet of FIG. 4B being laser etched.

FIG. 4A is a sectional view of a sheet coated with a polymer dispersed cholesteric liquid crystal and a transparent field spreading layer in accordance with the present invention. Polymer dispersed cholesteric layer 30 is codeposited in accordance with the exemplary embodiment over transparent field spreading layer 32. The cholesteric material has a peak reflectance of 550 nanometers. In FIG. 4B, vacuum evaporated chrome D1 is deposited over the polymer dispersed cholesteric layer 30 as evaporated metal 38. FIG. 4C is a sectional view of evaporated metal 38 being etched using a YAG laser having a wavelength of 1064 nanometers to create second conductors 40. Laser energy hυ is used to etch second conductors 40 without penetrating through polymer dispersed cholesteric liquid crystal 30 and vaporizing first conductor 20. Alternatively, second conductors 40 can be conductive material screen printed over polymer dispersed cholesteric liquid crystal 30.

Figure 5A:
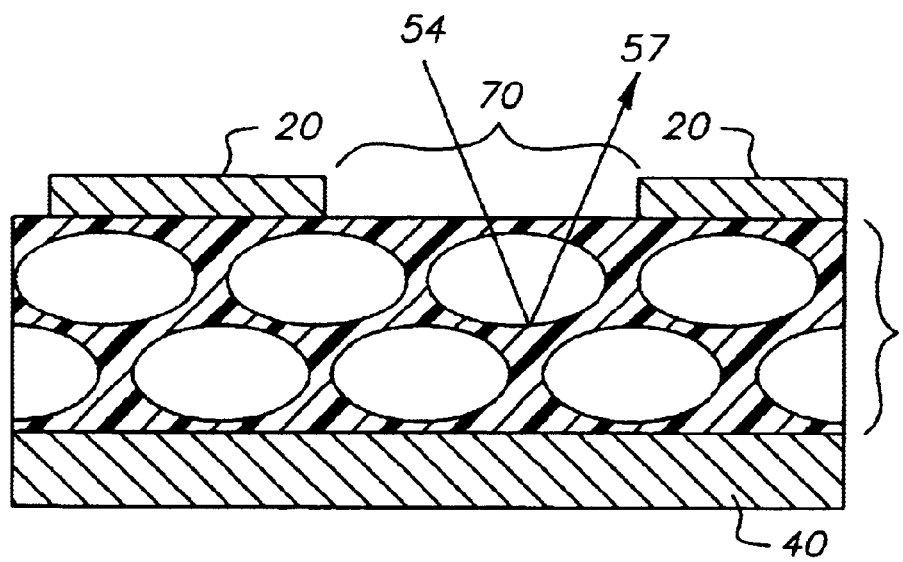
FIG. 5A is a sectional view light passing through the sheet of FIG. 1A in accordance with prior art.
Figure 5B:
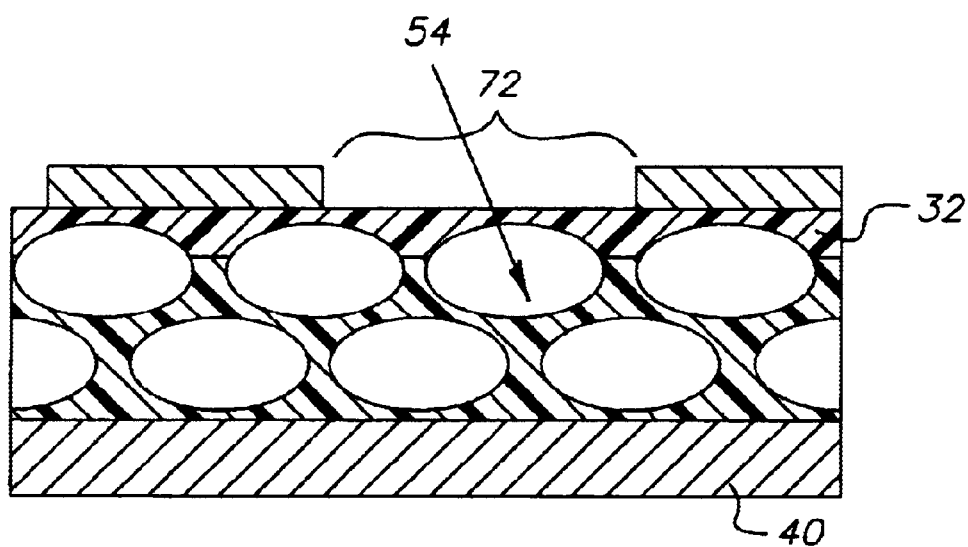
FIG. 5B is a sectional view light passing through the sheet of FIG. 1B in accordance with the current invention.

FIG. 5A is a sectional view of light passing through the sheet of FIG. 1A. Incident light 54 passing through polymer dispersed cholesteric layer 30 in the focal conic state is nominally absorbed by second conductors 40. Areas between first conductors 20 are inactive areas 70. After coating, inactive areas 70 are in an inactive, semi-reflecting state and some incident light 54 is reflected back as back scatter light 57 when polymer dispersed cholesteric layer 30 is in the focal conic state. Back scatter light 57 reduces light absorbency, creating a gray image instead of a black image. Therefore it is highly desirable to make material in inactive area 70 responsive to fields applied to adjacent first conductors 20. FIG. 5B is a sectional view of a sheet 10 in accordance with the present invention. The presence of transparent field spreading layer 32 causes material between adjacent first conductors 20 to become active areas 72 which eliminates back scatter light 57.

Figure 6:
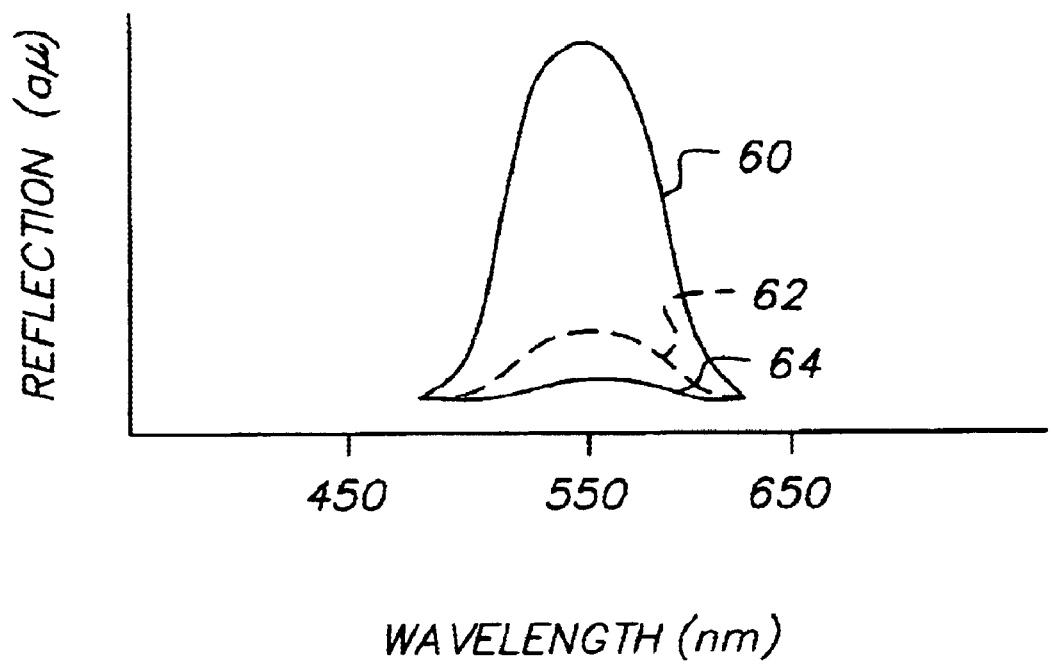
FIG. 6 is the spectral reflection of sheets in accordance with FIG. 1A and FIG. 1B.

FIG. 6 is a plot of light reflected from planar reflection 60, prior art focal conic reflection 62 and improved focal conic reflection 64. Back scatter light 57 creates a lighter, gray reflection for prior art focal conic reflection 62. The elimination of back scatter light 57 in sheet 10 with a transparent field spreading layer 32 lowers the darkness of sheet 10 and improves contrast ratio between the planar reflection 60 and improved focal conic reflection 64.

Figure 7A:
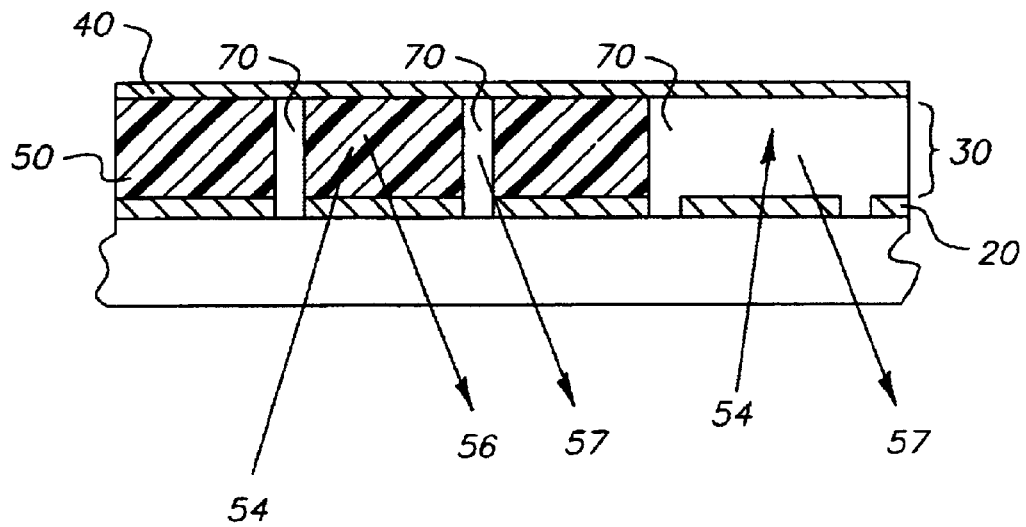
FIG. 7A is as sectional view of light passing through the sheet in FIG. 1A.

FIG. 7A is a sectional view of an experimental sheet 10 having green reflective cholesteric liquid crystal of conventional design. A high voltage pulse has been applied to the first three of first conductors 20 to convert cholesteric material the planar, reflective state 50. A low voltage pulse has been applied to the third first conductor 20 to convert cholesteric material to transparent focal conic liquid crystals 52. It was observed that cholesteric material not having both conductors was inactive material 70. Inactive material 70 provides a constant back scatter light 57 regardless of the state of electrically active pixels.

Figure 7B:
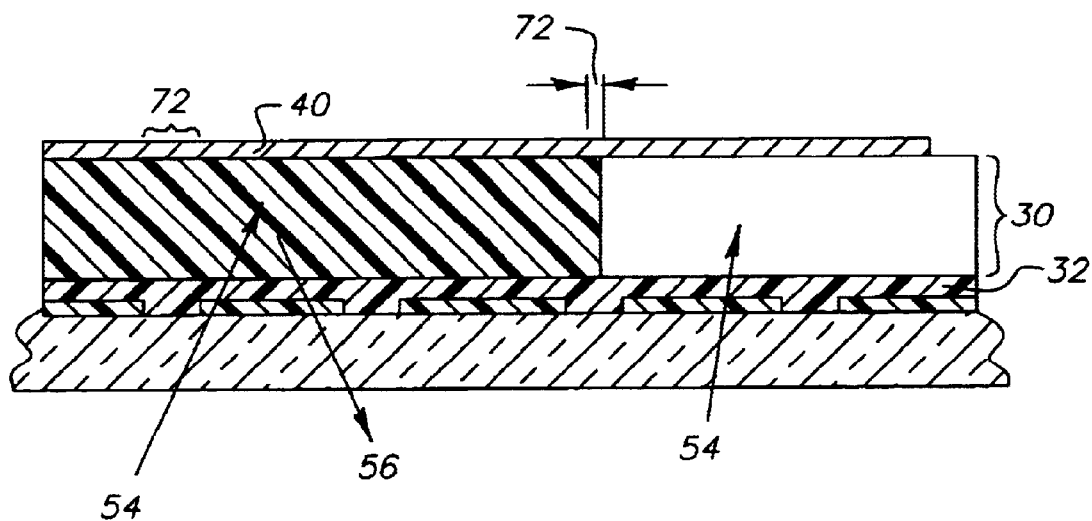
FIG. 7B is as sectional view of light passing through the sheet in FIG. 1B.

FIG. 7B is the same sheet in FIG. 7A having field spreading layer 32. The cholesteric material between adjacent second conductors 40 having a common potential becomes active material 72. Active area 72 nominally spreads out a millimeter. In the case of a matrix display, adjacent second conductors 40 with different electrical potential limits the spread of the electrical field present on adjacent conductors. Typically, the field spreads half-way between conductors of varying potential.

Figure 8A:
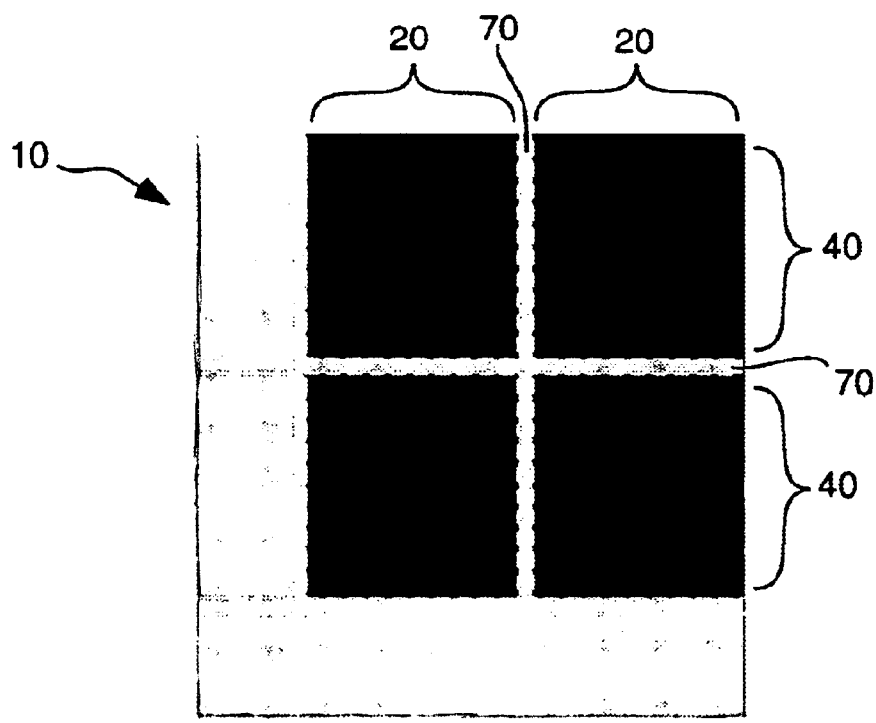
FIG. 8A is a top view of a written sheet in FIG. 1A.
Figure 8B:
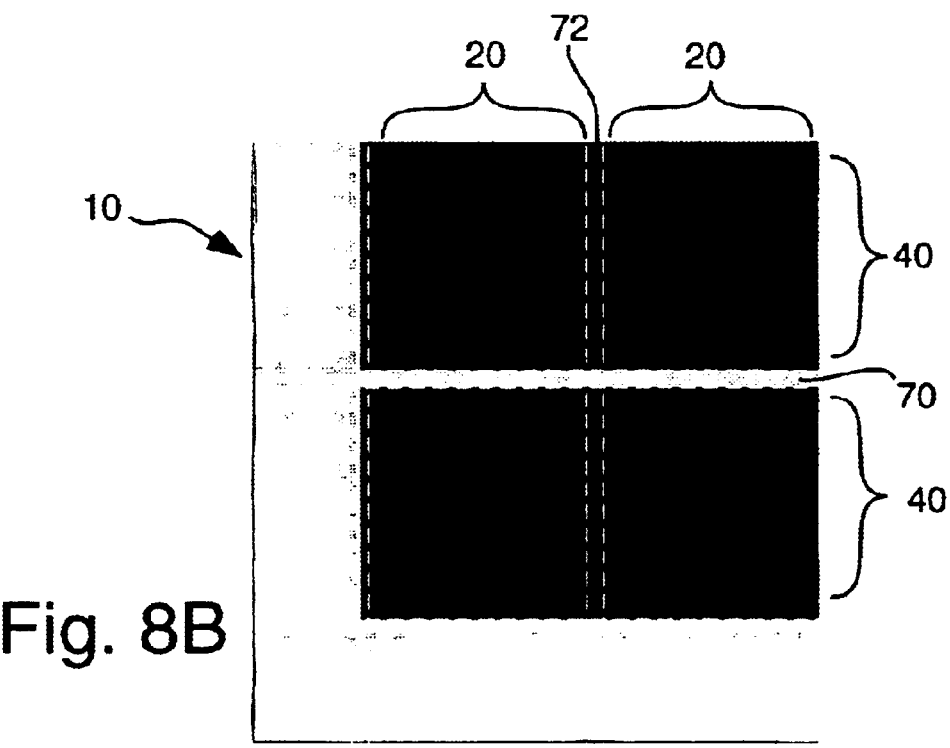
FIG. 8B is a top view of a written sheet in FIG. 1B.

FIG. 8A is a top view of a sheet 10 without a transparent field spreading layer 32. Four pixels are written into the focal conic state. Inactive material 70 exists horizontally and vertically in areas not covered by both first conductors 20 and second conductors 40. FIG. 8B is a top view of a display 10 having a transparent field spreading layer 32 disposed between polymer dispersed cholesteric layer 30 and vertical first conductors 20. Active material 72 exists between adjacent first conductors 20 at a common potential half way between adjacent second conductors 40 at different potential. The resulting sheet 10 has improved contrast.

The invention has been described in detail with particular reference to certain preferred embodiments thereof, but it will be understood that variations and modifications can be effected within the spirit and scope of the invention.

Parts List 10 sheet
15 substrate
20 first conductors
30 polymer dispersed cholesteric layer
32 transparent field spreading layer
38 evaporated metal
40 second conductors
50 planar liquid crystals
52 focal conic liquid crystals
54 incident light
56 reflected light
57 back scatter light
58 light absorber
60 planar reflection
62 prior art focal conic reflection
64 improved focal conic reflection
70 inactive material
72 active material
D1 vacuum evaporated chrome
hυ laser energy

What is claimed is:

1. A display sheet having polymer dispersed liquid crystals, comprising:

a) a substrate;

b) a state changing layer disposed over the substrate and defining first and second surfaces, such state changing layer having the polymer dispersed liquid crystals having first and second optical states, which can change state;

(c) a first conductor disposed over the first surface of the state changing layer;

d) a second conductor on the second surface of the state changing layer so that when a field is applied between the first and second conductors, the liquid crystals change state; and e) a nonconductive, field spreading layer having transparent electrically conductive polymer dispersed sub-micron particles, said nonconductive field spreading layer disposed between the state changing layer and the first conductor to provide a change of state in the state changing layer outside of areas between both conductors in response to a field applied between the first and second conductors which changes the state of the liquid crystals.

2. The display sheet of claim 1 wherein the same polymer is used to disperse the liquid crystals and the conductive polymer sub-micron particles.

3. The display sheet of claim 2 wherein the polymer is gelatin.

4. The display sheet of claim 2 wherein the polymer dispersed liquid crystal layer and the conductive sub-micron particles are sequentially or simultaneously deposited.

5. The display sheet of claim 2 wherein the polymer material for the liquid crystal layer and the nonconductive field spreading means are sequentially or simultaneously deposited.

6. The display sheet of claim 1 wherein the index of refraction of the first conductor and the field spreading layer are substantially the same.

7. The display sheet of claim 1 wherein the polymer dispersed sub-micron particles include polythiophene.

8. A method of making a display sheet having polymer dispersed liquid crystals comprising the steps of:

a) providing a substrate;

b) coating a state changing layer over the substrate having a first and second surface, such state changing layer having the polymer dispersed liquid crystals having first and second optical states;

c) providing a first transparent conductor disposed over the first surface of the state changing layer and a second conductor on the second surface of the state changing layer so that when a field is applied between the first and second conductors, the liquid crystals change state; and d) coating a nonconductive, field spreading layer having polymer dispersed sub-micron particles of a transparent electrically conductive polymer, said nonconductive, filed spreading layer disposed between the state changing layer and the first conductor to provide a change of state in the state changing layer outside of areas between both conductors in response to a field applied between the first and second conductors which changes the state of the liquid crystals.

9. The method of claim 8 wherein the display sheet is in the form of a web that is sequentially moved through one or more stations which sequentially or simultaneously deposits the state changing layer of field spreading layer.

10. The method of claim 8 wherein indium-tin-oxide is sputtered to form the first transparent conductor.

11. The method of claim 8 further including patterning the first and second conductors to produce an addressable matrix.

12. A display sheet having polymer dispersed liquid crystals, comprising:

a) a substrate;

b) a state changing layer disposed over the substrate and defining first and second surfaces, such state changing layer having the polymer dispersed liquid crystals having first and second optical states, which can change state;

c) a first conductor disposed over the first surface of the state changing layer;

d) a second conductor on the second surface of the state changing layer so that when a field is applied between the first and second conductors, the liquid crystals change state; and e) nonconductive means for spreading an electrical field, said nonconductive filed spreading means disposed between the state changing layer and the first conductor to provide a change of state in the state changing layer outside of areas between both conductors in response to a field applied between the first and second conductors which changes the state of the liquid crystals.

13. The display sheet of claim 12 wherein the nonconductive field spreading means includes a nonconductive polymer material with transparent and electrically conductive sub micron polymer particles dispersed in said nonconductive polymer material.

14. The display sheet of claim 13 wherein the same polymer material is used to disperse the liquid crystals and the conductive polymer sub-micron particles.

15. The display sheet of claim 14 wherein the polymer material is gelatin.

16. The display sheet of claim 12 wherein the index of refraction of the first conductor and the nonconductive field spreading means are substantially the same.

17. The display sheet of claim 12 wherein the nonconductive field spreading means comprises sub-micron particles of polythiophene.

* * * * *